UNITED STATES PATENT OFFICE.

FREDERIC P. DEWEY, OF WASHINGTON, DISTRICT OF COLUMBIA.

MANUFACTURE OF INSECTICIDES.

1,188,740.   Specification of Letters Patent.   Patented June 27, 1916.

No Drawing.   Application filed September 18, 1909.   Serial No. 518,339.

*To all whom it may concern:*

Be it known that I, FREDERIC P. DEWEY, citizen of the United States, residing at Washington, District of Columbia, have invented certain new and useful Improvements in the Manufacture of Insecticides, of which the following is a specification.

My invention relates to the manufacture of insecticides of the general composition of arsenates, and consists in transforming the elementally combined arsenic of arsenid compounds into arsenates suitable for the destruction of insects.

Native metallic arsenids suitable for my process are known to occur in various localities and especially in the region about Cobalt in Canada. Many silver and lead ores contain small amounts of arsenic which, in the smelting for base bullion, are converted into arsenid of iron and are recovered from the smelting operation as speiss, containing various other metals besides iron, which is also suited for my process.

The object of my invention is to convert the arsenic (As) of arsenid compounds into arsenic acid ($As_2O_5$) and transfer the arsenic acid into arsenates of suitable composition and physical condition, of which the arsenate of lead may be taken as a type, to form effective destroyers of insects when properly applied to growing vegetation.

To this end I roast or otherwise oxidize the metallic arsenid under the conditions most suitable for the production of the maximum amount of arsenic acid ($As_2O_5$) possible from the particular arsenid under treatment. The arsenic acid thereby formed is combined with an alkali to form a water soluble arsenate which is leached out of the material and the arsenic acid in the solution is precipitated in the form of an insoluble arsenate which may be directly applied as an insecticide or the precipitate may be further manipulated.

By roasting the native arsenids from Cobalt in Canada the basic elements of the arsenids are also oxidized and as a result the arsenic acid formed remains in the oxidized product in the form of metallic arsenates which may be generally designated as $M_3AsO_4$ although in many cases, if not in every case, basic arsenates are undoubtedly formed. After the formation of the metallic arsenates they are decomposed with the formation of a soluble arsenate, preferably arsenate of soda, which is dissolved in water and the solution separated from the residue by filtration, for instance. The residue remaining is then suitably washed and is treated for the recovery of the metals it may contain. The arsenate solution is next treated so as to transfer its arsenic acid into an insoluble arsenate in a condition suitable for being sprayed upon growing vegetation by the ordinary spraying machines.

The production of the insecticide from the arsenate solution may be accomplished in various ways. The insoluble arsenate may be precipitated directly from the original filtrate by double decomposition, by the addition to it of a solution of a suitable salt such as chlorid of calcium or acetate of lead. Arsenate of barium may be precipitated by the addition of a solution of barium hydrate and this procedure has the further advantage that it sets caustic soda free, which may be reused in the earlier stages of the process. The emulsion of calcium hydrate known as milk of lime may also be used for the production of calcium arsenate with the setting free of caustic soda for reuse. The filtrate may be boiled with the oxid of lead, litharge, for the production of arsenate of lead with the setting free of caustic soda for reuse. The filtrate when sufficiently caustic may be boiled with litharge and the resulting arsenate of lead held in solution, from which the arsenate of lead may be precipitated by passing carbonic acid gas through the solution. In this case the soda will remain in the solution filtered from the arsenate of lead in the form of carbonate, but a simple treatment with milk of lime will render it caustic and after evaporation it can be reused in the process.

In some cases it may be desirable to separate the arsenate of soda from the filtrate for the purpose of purification by the ordinary operation of crystallization and to prepare a fresh solution of arsenate of soda by redissolving the crystals in water before proceeding to the precipitation of the insecticide.

After the precipitation of the insecticide, by whatever method this is brought about, it is treated as may be required. If the arsenate of lead, for instance, is produced, it may be filtered off, preferably on a filter press, suitably washed and pressed to a paste containing approximately 50% of water to form the arsenate of lead paste of commerce. Or, after pressing as dry as possible, it may be further dried and ground to a fine powder for use when a dry insecticide may be required as in the destruction of the cotton boll weevil. Under some conditions, however, it may be better to apply the arsenate directly in a spray without removing it from the solution in which it was precipitated.

After filtering off the insecticide the filtrate may be used, according to circumstances and the method used in the precipitation. If, for instance, the arsenate of lead is precipitated by double decomposition of arsenate of soda and acetate of lead the filtrate will contain acetate of soda and may be utilized to produce fresh acetic acid which may be reused in the formation of acetate of lead. By this operation the acetic acid is kept in circulation in the process. If arsenate of lead is produced by decomposing the arsenate of soda by litharge the caustic filtrate may be evaporated to the proper strength and used to decompose a fresh charge of roasted ore and form a new solution of arsenate of soda. In this way the soda is kept in a cycle of operations and used over and over again in the formation of arsenate of soda. The same is also true when barium or calcium arsenates are precipitated by the corresponding hydrates.

It is well known that in the ordinary roasting of ores containing arsenids some arsenic acid ($As_2O_5$) is formed but heretofore in such roasting every effort has been made to keep the amount of arsenic acid formed at the smallest amount possible and even when once it was formed it was often broken up again by reducing it to the volatile arsenious acid ($As_2O_3$) which was driven off from the roasted ore. Previous to my invention it has never been proposed to utilize this method of forming arsenic acid and no one had roasted arsenid ores for the purpose of forming the maximum amount of arsenic acid ($As_2O_5$). All previous roasting of arsenid ores has been for the purpose of removing the arsenic as completely as possible from the roasted ore in order to facilitate the extraction of the valuable metals the ore contained, while my roasting seeks to oxidize the arsenic beyond the arsenious condition as fully as I can for the definite purpose of retaining the largest quantity obtainable of the arsenic in the roasted ore in the form of arsenic acid ($As_2O_5$).

Again in the preparation of certain ores for smelting, after being roasted in the ordinary way, these roasted ores have been treated with niter and soda and the resulting arsenate of soda washed out of the roasted ore, but notwithstanding that there has been a large commercial demand for arsenate of soda for many years no one has ever proposed to utilize the arsenate of soda produced in this way. It was treated entirely as a waste product and thrown away. In fact the amount of arsenate of soda that would thus be produced from a ton of arsenid ore after being roasted in the ordinary way for the maximum removal of arsenic would be insignificant, and it required my invention for the roasting of ores for the maximum production of arsenic acid to make the roasting of arsenid ores commercially available for the production of arsenate of soda. I therefore call the roasting of arsenid ores for the production of the maximum amount of arsenic acid an arsenate roast.

The chief requirement in the roasting of arsenids for the production of the maximum amount of arsenic acid is to keep the temperature of roasting sufficiently low. It is, of course, essential that there should be a liberal supply of air.

In practising my invention, for instance, upon the rich arsenids from the Cobalt region, which have the following general composition: arsenic 30–60%, cobalt 5–15%, nickel 3–10%, silver 300–5000 oz. per ton, with varying amounts of gangue or rock matter, the ores are crushed 40—60 mesh being convenient, and then roasted at a low temperature with careful regulation of the heat at one of the ordinary roasting furnaces provided with means for preventing the escape into the works of the poisonous arsenious acid ($As_2O_3$) which is also produced and given off during the roasting. I have successfully used a revolving furnace of the White-Howell type connected through a dust chamber and fan to a series of cotton bags in which to collect the white arsenic. I have discovered that the arsenic begins to oxidize considerably below the melting point of lead and when this oxidation sets in the greatest danger lies in its developing too much heat for the successful conduct of the operation and it may even be necessary to reduce the supply of external heat in order to prevent too rapid a rise in temperature. When the copious evolution of arsenious acid begins to abate the heat may be gradually increased but the temperature should not be allowed to much exceed 600 degrees C. The following is a record of roasting 100 grams of ore carrying 2700 oz. of silver per ton, 58% arsenic, 11% cobalt, 4% nickel, in a gas heated muffle. Starting with a cold furnace and a low gas flame, $As_2O_3$ began to come off in seventeen minutes, in about an hour lead melted in a small scorifier back of the charge and red spots began to appear in the ore, in order to keep the temperature down the ore was stirred vigorously, in about half an hour the reaction slackened, in about three quarters of an hour the charge was removed, having been three hours and eight minutes in the furnace and at the close zinc was just thorough-melted in a small scorifier in front of the charge.

After roasting the ore may carry from 15 to 30% of arsenic in the form of arsenic acid ($As_2O_5$), combined with the various metallic oxids in the roasted ore, as metallic arsenates.

A properly roasted ore will remain fairly pulverulent, but if lumps should be formed they may easily be reduced to powder. To the roasted ore in powder is added a sufficient amount of sodium hydrate, preferably in the form of a concentrated solution, say 1.10–1.25 specific gravity, to combine with the arsenic acid of the roasted ore and leave a slight excess and the mixture heated in a cast iron or other pot provided with means for stirring the charge. Of course the amount of sodium hydrate used varies with the amount of arsenic acid remaining in the roasted ore. The pot is then heated by a steam jacket or otherwise and the charge stirred until it becomes a thick pasty mass through the evaporation of the water and the chemical reactions taking place within the mass. The temperature to be employed in this heating depends upon a variety of conditions such as the strength of the caustic soda solution, the amount of arsenic acid present, the proportion of inert material present, the amount of water driven off, the amount of water held as water of crystallization by the salts formed and others. The temperature of the mass under treatment will therefore vary from time to time. By this treatment the arsenic acid is forced to leave the metallic oxids and combine with the soda, while the oxids are separated in various forms. When this treatment is finished the charge is allowed to cool off, if necessary, and then water is added to dissolve the soda arsenate and form a concentrated solution and the charge thoroughly stirred, heat being applied if necessary. The strong solution of soda arsenate is next separated from the insoluble residue by a suitable filter and the residue washed, after which it may be utilized for the metals it contains.

The arsenate of soda is very soluble in hot water and by proper management the combined filtrate and wash water may carry ten per cent. of arsenate of soda in solution, which is a convenient proportion to operate. To this solution a proper amount of milk of lime, depending upon the volume and strength of the arsenate of soda solution, may be added, whereupon the arsenic acid is precipitated from the solution as arsenate of lime. The reaction taking place may be represented by the following formula:—

$$2Na_3AsO_4 + 3Ca(OH)_2 = Ca_3(AsO_4)_2 + 6NaOH.$$

The precipitated arsenate of lime may be filtered off, suitably washed, and put upon the market as a moist paste, or it may be dried and ground and put upon the market as a dry powder.

The solution of caustic soda filtered from the arsenate of lime is evaporated to about 1.20 sp. gr. and reused in decomposing a fresh lot of roasted ore. By this process the soda is first united with arsenic acid and then separated from it with the formation of an insecticide; it is then combined with a fresh lot of arsenic acid which is then transformed into an insecticide and this operation may be repeated many times.

By proper management the filtrate from the caustic soda treatment of the roasted ore may be kept strong enough in arsenate of soda to deposit crystals of this salt on cooling, so that on running the filtrate into a tank and allowing it to cool an abundant crop of crystals of arsenate of soda may be obtained. The final mother liquor may be causticized with lime and the resulting caustic soda reused in the process.

The crystals of arsenate of soda may be dissolved in water in the same tanks in which they were formed to a ten per cent. solution and this solution mixed with a ten per cent. solution of acetate of lead. There will then be an interchange of acids and bases, the arsenic acid of the arsenate of soda will combine with the lead of the acetate of lead forming insoluble arsenate of lead which will separate as a finely divided, slimy, and very sticky precipitate, while the acetic acid of the acetate of lead will combine with the soda of the arsenate of soda and the resulting acetate of soda will remain in solution. The reaction taking place may be represented by the following formula:—

$$3Pb(C_2H_3O_2)_2 + 2Na_3AsO_4 = Pb_3(AsO_4)_2 + 6NaC_2H_3O_2$$

This precipitate of arsenate of lead may be filtered off on a filter press, suitably washed and pressed until it contains approximately 50% of water, when it is removed from the press and put upon the market as the ordinary arsenate of lead paste for use as an insecticide. It also may be pressed as dry as possible and removed from the press when it is further dried and brought to the condition known as bone dry. It may then be finely ground and put upon the market as powdered dry arsenate of lead for insecticide purposes.

The filtrate from the arsenate of lead precipitation may be suitably concentrated, transferred to a copper still and heated with sulfuric acid to decompose the acetate of soda it contains and drive off the resulting acetic acid. The acetic acid fumes may be conducted to the bottom of a tower and allowed to ascend, passing over finely divided lead, when, in the presence of sufficient air, the acetic acid dissolves the lead forming acetate of lead.

Sufficient water may condense from the steam to dissolve the acetate of lead formed to a ten per cent. solution, but if not, sufficient water may be introduced at the top of the tower for this purpose and the resulting solution mixed with the arsenate of soda solution, produced at a previous stage of the process, for the production of a fresh lot of arsenate of lead. By this process the acetic acid is first combined with lead which is transferred to an arsenical insecticide and the acetic acid is combined with a fresh lot of lead which is then transferred into an insecticide and this operation may go on repeatedly.

It will thus be seen that in my process of transforming the elementally combined arsenic of arsenid compounds into arsenate insecticides we have two processes going on in cycles in which the reagents are used and reused over and over again giving very great economy to the process.

What I claim as new and valuable is:

1. The process of preparing arsenate compounds suitable for insecticides from arsenids, which consists in oxidizing the arsenic of the arsenid to arsenic acid, combining the arsenic acid into a water soluble arsenate and transferring the arsenic acid into an insoluble arsenate, substantially as described.

2. The process of preparing arsenate compounds suitable for insecticides from arsenids, which consists in oxidizing the arsenic of the arsenid to arsenic acid, combining the arsenic acid into arsenate of soda and transferring the arsenic acid into an insoluble arsenate, substantially as described.

3. The process of preparing arsenate compounds suitable for insecticides from arsenids, which consists in oxidizing the arsenic of the arsenid to arsenic acid, combining the arsenic acid into arsenate of soda and transferring the arsenic acid into arsenate of lead, substantially as described.

4. The process of preparing arsenate compounds suitable for insecticides from arsenids, which consists in roasting the arsenid for the formation of metallic arsenates, treating the roasted material with caustic soda, dissolving the arsenate of soda formed thereby in water, filtering from the insoluble residue, adding acetate of lead to the filtered solution, filtering again, adding sulfuric acid to the filtrate, converting the acetic acid developed thereby into acetate of lead and using this acetate of lead to decompose a fresh solution of arsenate of soda, substantially as described.

5. The process of preparing arsenate compounds suitable for insecticides from arsenids, which consists in oxidizing the arsenic of the arsenid into arsenic acid and converting this arsenic acid into a water soluble arsenate, dissolving the soluble arsenate in water and separating the solution from the insoluble residue and precipitating the arsenic acid out of this solution as an insoluble arsenate, substantially as described.

6. The process of preparing arsenate compounds suitable for insecticides from arsenids, which consists in roasting the arsenid for the formation of arsenic acid, treating the roasted material with caustic soda, dissolving the arsenate of soda thereby formed in water, separating the solution of arsenate of soda from the balance of the material, transferring the arsenic acid of the arsenate of soda solution into an insoluble arsenate and separating the precipitate from the solution, substantially as described.

7. The process of preparing arsenate compounds suitable for insecticides from arsenids, which consists in oxidizing the arsenic of the arsenid into arsenic acid and converting this arsenic acid into arsenate of soda, dissolving the arsenate of soda in water, separating the solution from the insoluble residue, recovering the arsenate of soda from the solution by crystallization, redissolving the arsenate of soda in water, transferring the arsenic acid of the solution into an insoluble arsenate and separating the insoluble precipitate from the solution, substantially as described.

8. The process of preparing arsenate compounds suitable for insecticides from arsenids, which consists in roasting the arsenids for the formation of arsenic acid, treating the roasted material with caustic soda, dissolving the arsenate of soda thereby formed in water, separating the solution of arsenate of soda from the balance of the material, separating the arsenate of soda from the solution by crystallization, redissolving the crystals in water, precipitating the arsenic acid of this solution as an insoluble arsenate and separating the precipitate from the solution, substantially as described.

9. The process of treating arsenids which consists in oxidizing the arsenid for the formation of arsenic acid, forming this arsenic acid into a water soluble arsenate, transferring the arsenic acid into an insoluble arsenate and separating the precipitate from the solution, substantially as described.

10. The process of treating arsenids which consists in roasting the arsenid for the formation of arsenic acid, converting the arsenic formed thereby into arsenate of soda, dissolving the arsenate of soda in water, filtering and precipitating the arsenic acid from the filtered solution as an insoluble arsenate, substantially as described.

11. The process of treating arsenids which consists in oxidizing the arsenid for the formation of metallic arsenates, converting the arsenic acid formed thereby into arsenate of soda, dissolving the arsenate of soda in water, filtering and precipitating the arsenic acid from the filtered solution as an insoluble arsenate, substantially as described.

12. The process of treating arsenids which consists in roasting the arsenid for the formation of metallic arsenates, converting the arsenic acid formed thereby into arsenate of soda, dissolving the arsenate of soda in water, filtering and precipitating the arsenic acid from the filtered solution as arsenate of lead, and separating the arsenate of lead from the solution, substantially as described.

13. The process of treating arsenids which consists in roasting the arsenid at a low temperature, treating the roasted material with strong caustic soda solution, treating the mass thereby produced with water, filtering, crystallizing the arsenate of soda out of the solution, redissolving the arsenate of soda in water, adding a solution of acetate of lead and filtering to a paste containing approximately fifty per cent. of water, substantially as described.

In testimony whereof I affix my signature in presence of two witnesses.

FREDERIC P. DEWEY.

Witnesses:
H. H. MILLER,
J. T. BRYANT.